(12) United States Patent
Teich et al.

(10) Patent No.: US 8,072,586 B2
(45) Date of Patent: Dec. 6, 2011

(54) ARRANGEMENT AND METHOD FOR FOCUSING A MULTIPLANE IMAGE ACQUISITION ON A PROBER

(75) Inventors: Michael Teich, Moritzburg OT Friedewald (DE); Ulf Hackius, Dresden (DE); Juliane Busch, Dresden (DE); Joerg Kiesewetter, Thiendorf OT Sacka (DE); Axel Becker, Dresden (DE)

(73) Assignee: Cascade Microtech, Inc., Beaverton, OR (US)

( * ) Notice: Subject to any disclaimer, the term of this patent is extended or adjusted under 35 U.S.C. 154(b) by 0 days.

(21) Appl. No.: 12/847,723

(22) Filed: Jul. 30, 2010

(65) Prior Publication Data
US 2011/0013011 A1 Jan. 20, 2011

Related U.S. Application Data

(63) Continuation of application No. 11/964,744, filed on Dec. 27, 2007.

(30) Foreign Application Priority Data

Dec. 27, 2006 (DE) .......................... 10 2006 062 297
Jan. 9, 2007 (DE) .......................... 10 2007 002 097

(51) Int. Cl.
*G01N 21/00* (2006.01)

(52) U.S. Cl. ............................................. 356/73; 348/87
(58) Field of Classification Search ................... 356/73, 356/399; 324/758; 348/87
See application file for complete search history.

(56) References Cited

U.S. PATENT DOCUMENTS

| 5,394,100 | A | * | 2/1995 | Bohler et al. | 324/757 |
| 6,002,426 | A | * | 12/1999 | Back et al. | 348/87 |
| 6,096,567 | A | * | 8/2000 | Kaplan et al. | 324/758 |
| 2006/0184041 | A1 | * | 8/2006 | Andrews et al. | 600/476 |
| 2008/0158664 | A1 | * | 7/2008 | Teich et al. | 359/363 |

* cited by examiner

*Primary Examiner* — Kara E Geisel
(74) *Attorney, Agent, or Firm* — Dascenzo Intellectual Property Law, P.C.

(57) ABSTRACT

A focused multi-planar image acquisition in real time even while a test object is moving, is achieved with a system and a method for a focused multi-planar image acquisition in a prober. When a surface of a test object is positioned laterally in relation to tips of separated probe needles, a microscope is focused on the surface of the test object at a first time and on a plane of the probe needles at a second time. The objective lens is provided with a microscope objective lens focusing system, which can focus the objective lens, independently of a vertical adjustment drive of the microscope, on the surface of the test object in a first focal plane and in a second focal plane, which is on a level with the probe needle tips.

4 Claims, 4 Drawing Sheets

ARRANGEMENT AND METHOD FOR FOCUSING A MULTIPLANE IMAGE ACQUISITION ON A PROBER

CROSS REFERENCE TO RELATED APPLICATIONS

This application claims priority from German patent application No. 10 2006 062 297.9, filed on Dec. 27, 2006, and German patent application No. 10 2007 002 097.1, filed on Jan. 9, 2007. The entire disclosure of these applications are hereby incorporated by reference.

BACKGROUND ART

The invention relates to a system for a focused multi-planar image acquisition in a prober, which is provided with a movement device and a clamping fixture, which is mounted on said movement device and is intended for a test object. Furthermore, the prober exhibits probe needles, which can make contact with the test object; holding devices for the probe needles; and a clamping plate, which is arranged above the clamping fixture and on which the holding devices can be mounted and which exhibits a viewing aperture, which visibly exposes the surface of the test object. The system is provided with an image capturing device, which is mounted above the viewing aperture and which comprises a microscope with an objective lens and an objective holder. Said system is also provided with a lighting device, which can generate a light beam, directed on the surface of the test object.

The invention also relates to a method for a focused multi-planar image acquisition in a prober. According to the method, when the surface of a test object is positioned laterally in relation to the tips of the separated probe needles, a microscope is focused on the surface of the test object at a first time and on the plane of the probe needles at a second time.

There exist so-called confocal microscopes in order to generate three-dimensional images of microscopically small objects, like cells, pollen grains or the like. A confocal microscope is a variant of the light microscope, with which virtual optical cross sectional scans of an object can be produced. These cross sectional scans are then assembled with suitable software into a three dimensional display.

In these confocal microscopes the light falls through an aperture diaphragm on the specimen via a beam splitter mirror and an objective lens. The emitted light is captured by the objective lens and focused on the aperture of an aperture diaphragm, behind which is located the detector. The aperture diaphragm causes the beams from layers, which are located higher or lower than the focal plane, for which the objective lens is set, to be blanked out. The result is an image that matches a sectioning of the specimen in the focal plane. In order to obtain a three dimensional image with confocal microscopes, the image of this focal plane is stored. Then the focus of the objective lens is put into another focal plane, which is at a distance from the first focal plane. Thereupon an image, which matches a cross sectional scan of the specimen in this other focal plane, is generated and stored. After several repetitions of this procedure, a three dimensional image of the specimen is generated from the individual images from the various focal planes with suitable software.

In order to adjust the focus of the objective lens of the confocal microscope it is known to use microscope objective lens focusing systems as fast and compact adjustment units, which can be easily installed in most microscopes. In so doing, they are screwed in between the turret and the objective lens. To this end, such a microscope objective lens focusing system exhibits a turret-sided threaded shaft, which can be screwed into the objective thread of the microscope turret. Then the objective lens itself can be screwed into an internal thread in the microscope objective lens focusing system.

The threaded shaft and the internal thread can be moved in the axial direction in relation to each other by means of a position-encoded piezoelectric linear actuator. By applying various voltages to the piezoelectric linear actuator, the distance between the objective lens and the turret head and, thus, the focus can be modified by electric means. Hence, a suitable focal plane can be selected while scanning with a confocal microscope by varying the voltage in the microscope objective lens focusing system.

In these confocal microscopes, the object to be examined is illuminated with a laser beam. In this case the laser beam is expanded in such a manner that it illuminates the entire object. Another possibility with respect to a total illumination of the object is not to fan out, but rather to deflect temporally the laser beam along the line of a scanner mode and, thus, to illuminate the object by means of a scanned laser beam.

There also exist white light confocal microscopes, with which a color image is also possible, but with a lower intensity.

There exist so-called probers to test components, in particular semiconductor components, for their operational function and the impact that physical parameters have on them. A prober generally consists of a movement device, for example, an X-Y cross-table, which can also perform slight rotary motions in order to correct the position. This movement device has a clamping fixture—a so-called chuck. Hence, the test object can be mounted on this clamping fixture. Above the clamping fixture is a clamping plate, which is provided with a feed-through and viewing aperture. At this stage holding devices for the probe needles can be mounted on this clamping plate, for example, by means of vacuum holders, so that the probe needles can extend through the feed-through and viewing aperture and make an electric contact at the corresponding points on the object to be tested, thus measuring the object to be tested for its electrical properties.

There also exist solutions with so-called probe cards, where the probe needles are mounted, as the probe card needles, securely on the probe card; and then the probe card is placed securely in the clamping plate.

Basically the objects to be tested have to be positioned in relation to the tips of the probe needles. To this end, a vertical motion of the movement device usually brings about a separation between the object to be tested and the probe needles. The distance between the tips of the probe needles and the test object ranges usually from 200 to 250 μm. Then the movement device moves the clamping fixture and, thus, the object to be tested in such a manner that another test object or another part of the test object comes to rest under the tips of the probe needles. Thereafter, an additional vertical motion places again the object to be tested in contact with the tips of the probe needles. As a rule, this positioning operation is controlled by an image capturing device, which comprises a microscope and usually also a video camera. The image capturing device—that is, the objective lens of the microscope—is mounted above the viewing aperture. The image capturing device photographs the surface of the object to be tested, which in turn is passed to an image evaluating unit. Then with the image evaluating unit it is possible to control with suitable analysis programs the movement device so accurately that the tips of the probe needles come to rest directly over the corresponding contacts on the test object; and the measuring process can begin.

In the case of manual probers, the viewing takes place either by way of a monitor, which reproduces and enlarges the video camera-generated image, or directly at the eyepiece of the microscope by an operator, who then controls the positioning and the electrical contacting in accordance with the indicated position.

For a sharp setting of the image captured by the microscope, this microscope is provided with a vertical adjustment drive, by means of which an adjustment of the entire microscope changes the distance between the objective lens and the imaging plane.

Before the tips of the probe needles make contact with the contacts on the test object, the tips and the contact surface lie in different imaging planes with respect to the objective lens. As a result, a sharp image of both the tips and the contact surface can never be obtained simultaneously.

In the case of a manual prober the operator's first step is to guide the contact pads of the test object under the probe needles, which can be seen only as very ill-defined shadows. Then the second step is to decrease the distance between the probe needles and the test object. This action will bring the probe needles sharper into focus, if the microscope is focused on the test object. Hence, it is still feasible to make some subsequent adjustments. However, it is not until contact has actually been made that it is possible to determine exactly whether the tips of the contact needles are, in fact, exactly on the contact pads of the test object. If necessary, the operator has to break the contact once again, re-position, and then make contact again.

In the case of probers, where the microscope image is mapped in an image evaluating device, both objects can be brought into sharp focus by capturing the image of the wafer surface in a first step. Then in a second step after mechanical adjustment of the microscope the sharp image of the probe tip is captured. Thereupon the two images are stacked one on top of the other and assembled into one sharp composite image. Thus, a sharp image of both the probe needles and the test object is produced, however, this applies only to the static image, thus not to the real time mode.

SUMMARY OF THE INVENTION

At this stage the object of the invention is to enable a focused multi-planar image acquisition in real time—that is, even while the test object is moving.

This object is achieved by the invention with a system, where the objective lens is provided with a microscope objective lens focusing system, which can focus the objective lens, independently of the vertical adjustment drive of the microscope, on the surface of the test object in a first focal plane and in a second focal plane, which is on a level with the probe needle tips. This solution makes it possible to focus without having to move the entire microscope. As a result, the masses to be moved are significantly less as compared to the prior art, a feature that can be exploited to carry out the focusing in very short time intervals. Consequently while the test object is moved in relation to the probe needles, the focusing can be alternated multiple times. Therefore, with a suitable image reproduction it is also possible to obtain a sharp image of both the tip of the probe needle and the surface of the test object. This feature can be utilized in an advantageous manner in both manual probers with a visual observation up to totally automatic probers with an automatic image detection and positioning.

The distance between the objective lens and the eyepiece or the image capturing plane is changed by means of a microscope objective lens focusing system—a feature that, in principle, is already possible with purely mechanical solutions. However, the adjustment is significantly simplified, if the microscope objective lens focusing system is designed so as to be electrically adjustable and is connected to a control unit, which controls the movement of the microscope objective lens focusing system. In this case the control unit could be a simple switch, which triggers the two focuses by means of two switch positions. Such a solution is conceivable, for example, in a manual prober, where, depending on how skilled the operator is in positioning, the operator himself switches back and forth between the two focus settings.

An especially fast adjustment capability of the microscope objective lens focusing system is achieved by providing it with a piezo drive.

In principle, a focus adjustment can be integrated into the objective lens or in a different location in the beam path of the microscope. However, it is very practical to arrange the microscope objective lens focusing system between the objective holder and the objective lens. Hence, it is possible to use commercially available objective lenses and also commercially available microscope objective lens focusing systems, even if they are provided for other applications—in particular, for use in confocal microscopes for generating three dimensional images.

The microscope objective lens focusing system can be installed in the microscope, which is present in a prober, without any major modifications, if said microscope has a microscope-sided threaded shaft, which can be screwed into the objective thread of the objective holder, and if the microscope has an internal thread for receiving the objective lens, and if the threaded shaft and the internal thread can be moved in relation to each other in the axial direction by means of a position-encoded piezoelectric linear actuator.

Even though it is not absolutely necessary, it is possible to design the microscope as a confocal microscope.

Another embodiment of the invention provides that the image capturing device is connected to an image evaluating unit. As a result, it is possible, on the one hand, to automatically position the test object in relation to the tips of the probe needles with the captured images of the surface of the test object and by the sharp imaging of the image of the probe needle that is projected on the surface image. On the other hand, it is possible to generate signals for controlling the microscope objective lens focusing system to correspond to the generated image. Such a feature would make it possible, for example, to control the focus setting.

In particular for this function it is very desirable that the control of the microscope objective lens focusing system is carried out by the image evaluating unit itself, in that said image evaluating unit comprises the control unit.

It is desirable for both the automation of the positioning process and for the visual observation of the manual positioning operation that the image capturing device has a video camera.

The problem, on which the invention is based, is solved by a method, wherein the objective lens is focused, independently of a vertical adjustment of the microscope, on the two focal planes at different times; and wherein the respective focus settings at the objective lens are changed multiple times during the positioning operation. Thus, it is possible to focus the objective lens without having to cope with high mass inertia (as is the case, for example, in focusing with the entire microscope) and to change the focus very rapidly. Thus, the method achieves that the imaging of the two focal planes appears to the viewer to be displayed simultaneously.

Especially in manual probers, where the viewing is done by eye, the simultaneously appearing imaging of both focal planes can be achieved by exploiting the eye's slowness in that the focus settings are changed at a rate that exceeds the eye's rate of slowness.

The changing of the focus settings at identical time intervals can be performed very simply, especially if the illumination takes place with a monochromatic light or a white light.

In order to improve the rendering of the microscope imaging it is desirable that the images captured by the microscope are captured by a video camera and displayed on a screen.

The use of a video camera also makes it possible to feed the video camera-captured images to an image evaluating unit and to store at least two images, which are captured in succession with different focus settings and to display said images in the display in such a manner that they are projected one over the other. As a result, it is also possible to select imaging rates that are below the slowness rate of the human eye, since they exist, of course, in the stored form. With the use of an image evaluating unit it is also possible to achieve especially good color images (to be explained in detail below).

An especially sharp and high resolution image rendering can be achieved if the image of at least the surface of the test object is composed of images taken in succession in different color channels. In so doing, the focus settings are changed in such a manner that several images of the test object are captured with an illumination, the color of which varies with the respective image. Then an image of the tip of the probe needle is taken. Finally one image is assembled from the images of the test image by projecting the image of the tip of the probe needle into said image.

Since most objective lenses are corrected for only two wavelengths (achromates) or three wavelengths (apochromates), it is desirable to further develop the inventive method in that, when an image is captured in a different luminous color, a focus setting that is optimized for sharpness with respect to the luminous color is carried out at the objective lens. Thus, any color-induced misfocusing can be avoided.

BRIEF DESCRIPTION OF THE DRAWING FIGURES

The invention is explained in detail below with reference to one embodiment. In the associated drawings FIG. 1 depicts an inventive prober in an embodiment with probe needles.

DETAILED DESCRIPTION

Figure 1:
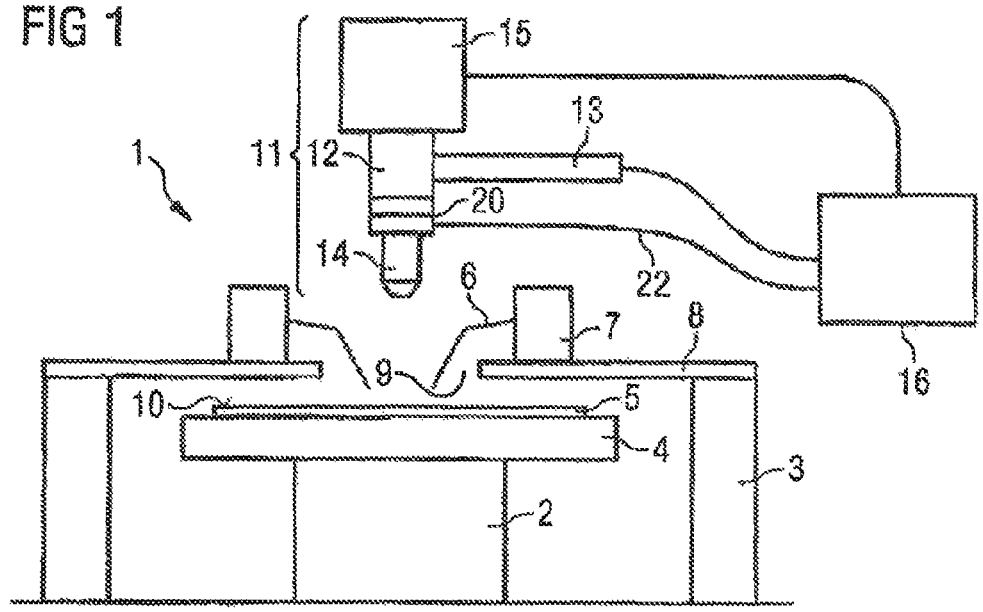

As shown in FIG. 1, a prober 1 comprises an X-Y cross table 2 as a movement device. The X-Y cross table 2 is disposed in a housing 3. A clamping fixture 4 is mounted on the X-Y cross table. In this case the clamping fixture 4 can be rotated by an angle $\Phi$. The clamping fixture 4 serves to receive a test object 5. The test object 5 may be, for example, a semiconductor wafer, on which there are a plurality of semiconductor chips, which in turn exhibit individual contact pads. In order to test the test object 5, the probe needles 6 make contact with said test object. An external test circuit (not shown in detail) makes contact, for example, with the contact pads of a semiconductor wafer, as the test object. Therefore, said contact pads are driven with electric signals; and in this way their reaction is determined.

One end of the probe needles 6 is fastened in probe holders 7. Hence, on the one hand, the probe holders serve to hold the probe needles and, on the other hand, to fine position the probe needles in relation to the test object. In order to fasten the probe holders 7, there is a clamping plate, a so-called probe holder plate 8. The probe holders 7 can be vacuum mounted on this probe holder plate 8 and are, thus, fixed in place.

The probe holder plate 8 is provided with an aperture 9. On the one hand, this aperture 9 exposes at the top the surface 10 of the test object 5 for observation. On the other hand, it is possible for the probe needles 6 to extend through this aperture 9 from the top side of the probe holder plate 8 as far as to the test object 5.

An image capturing device 11 is mounted above the viewing aperture 9 in the probe holder plate 8. This image capturing device 11 comprises a microscope 12 with a lighting device 13 and an objective lens 14 and a video camera 15. The video camera 15 is connected to an image evaluating unit 16. The image evaluating unit 16 in turn comprises a computer with suitable analysis software.

Figure 2:
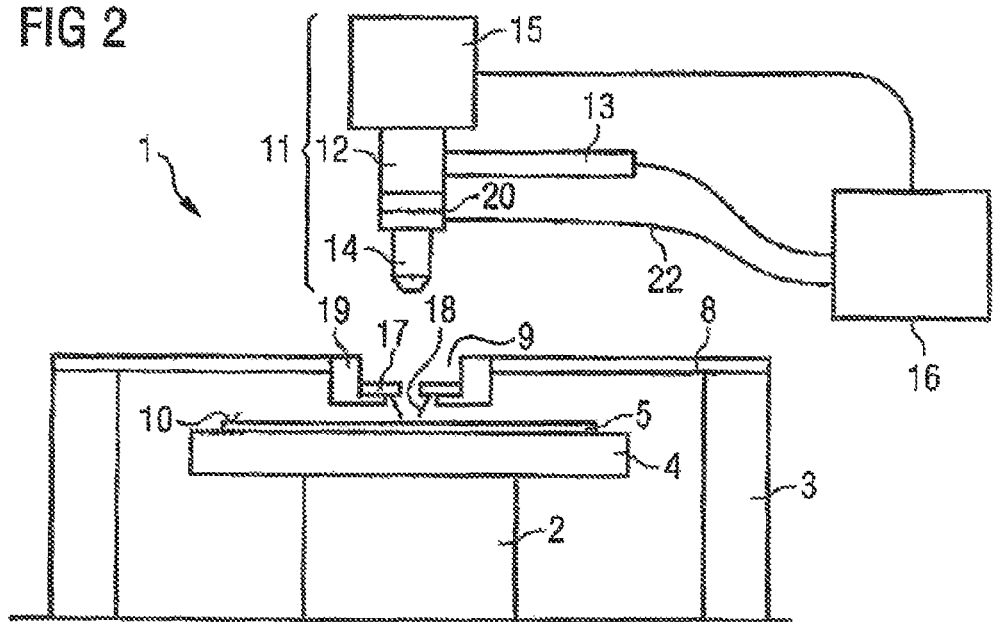
FIG. 2 depicts an inventive prober in an embodiment with a probe card.

FIG. 2 shows a design that is analogous to the design described in FIG. 1. The major distinction between the two embodiments lies in the use of a probe card 17 in FIG. 2, instead of individual probe needles 6 with separate probe holders 7. This probe card 17 exhibits its own probe card needles 18 and is held in the aperture 9 by means of a probe card adapter 19.

Figure 3:
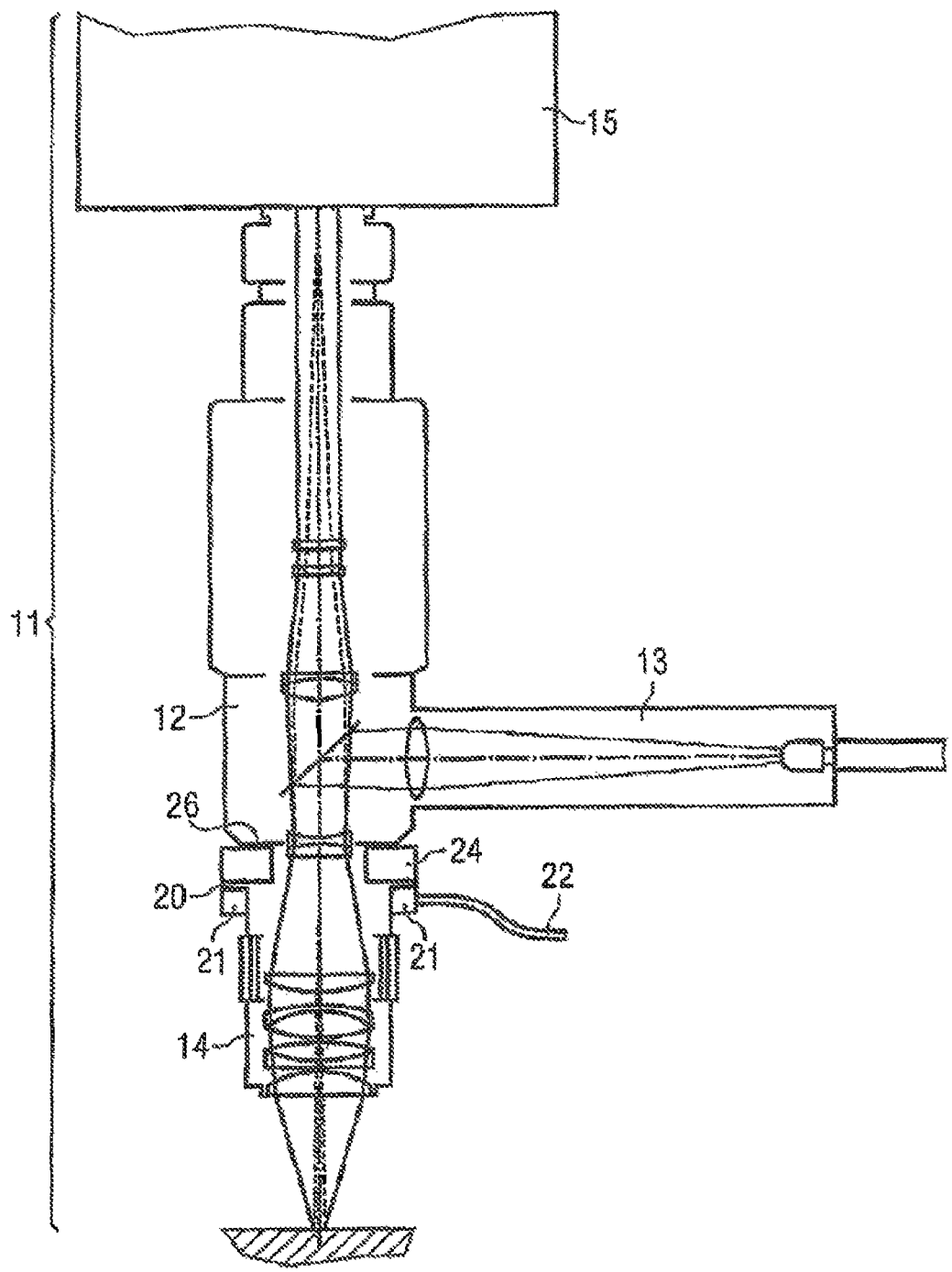
FIG. 3 is a sectional drawing of an inventive image capturing device.
Figure 4:
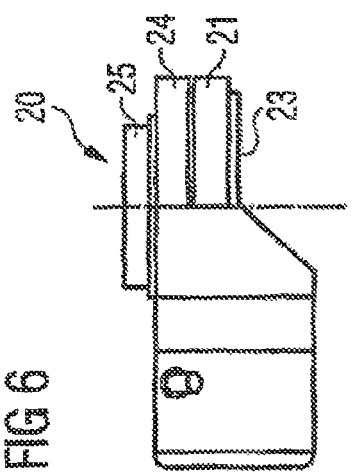
FIG. 4 is a front view of a microscope objective lens focusing system that is used according to the invention.
Figure 6:
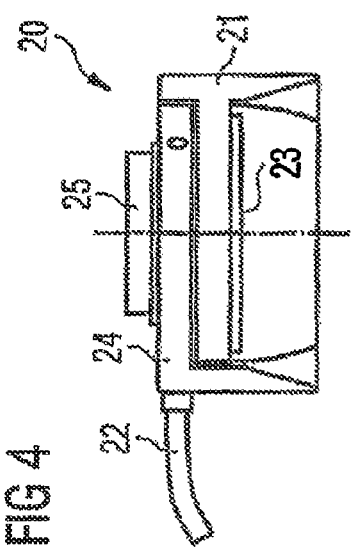
FIG. 6 is a side view of a microscope objective lens focusing system that is used according to the invention.
Figure 5:
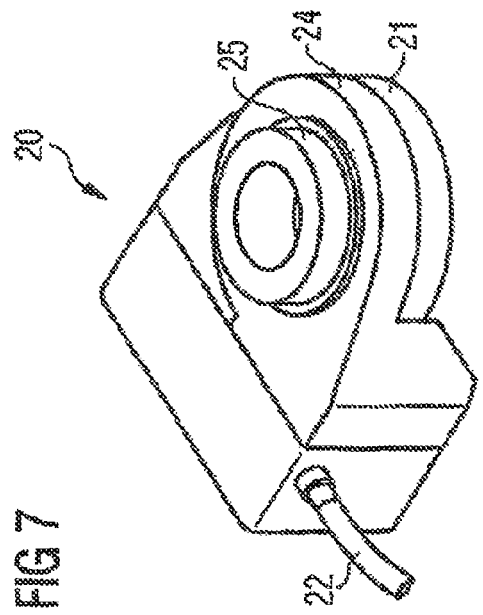
FIG. 5 is a top view of a microscope objective lens focusing system that is used according to the invention.
Figure 7:
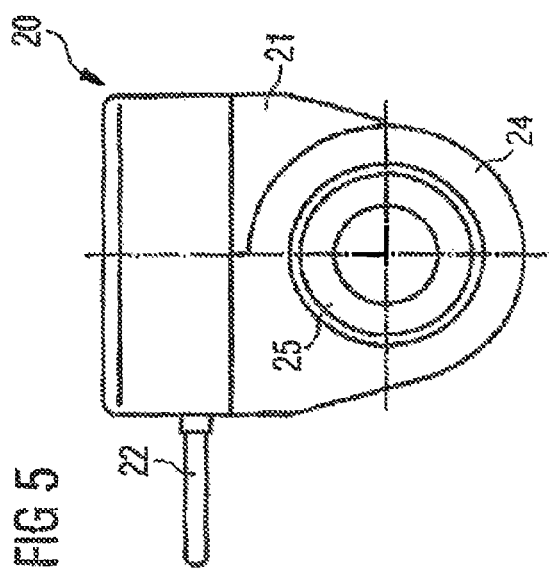
FIG. 7 is a perspective view of a microscope objective lens focusing system that is used according to the invention.

The image capturing unit, as depicted in FIGS. 1 and 2, is enlarged once again in FIG. 3 and shown as a sectional drawing.

For focusing purposes, the objective lens 14 is provided with a microscope objective lens focusing system 20. FIGS. 4 to 7 show in greater detail the microscope objective lens focusing system 20 that is used according to the invention. The microscope objective lens focusing system 20 comprises a bottom member 21, which receives a piezo drive, which is not illustrated in detail. This piezo drive, which is made of a material that changes geometrically on applying a voltage, constitutes an electric drive, which is connected via a connector 22 to the image evaluating unit 16, which contains the control unit (not illustrated in detail) for the piezo drive. The bottom member is provided with an internal thread 23, into which the objective lens 14 can be screwed. There is an upper member 24, which can be moved in the axial direction and—on use in the microscope 12—in the vertical direction in relation to the bottom member 21 and which can be driven by the piezo drive. Said upper member is provided with a threaded shaft 25. Therefore, the microscope objective lens focusing system 20 can be installed into the microscope 12, present in a prober 1, without any major modifications, since it can be screwed with the microscope-sided threaded shaft 25 into the objective thread of the objective holder 26. Then the internal thread 23 serves to hold the objective lens 14. As a consequence of the geometrical change in the piezo drive on application of a voltage, the focus of the objective lens 14 is adjusted.

This microscope objective lens focusing system 20 is also connected to the image evaluating unit 16 by way of the connector 22, so that with the software, installed in the image evaluating unit 16, the microscope objective lens focusing system 20 can adjust the focus of the objective lens very quickly as a function of the images to be captured.

Figure 8:
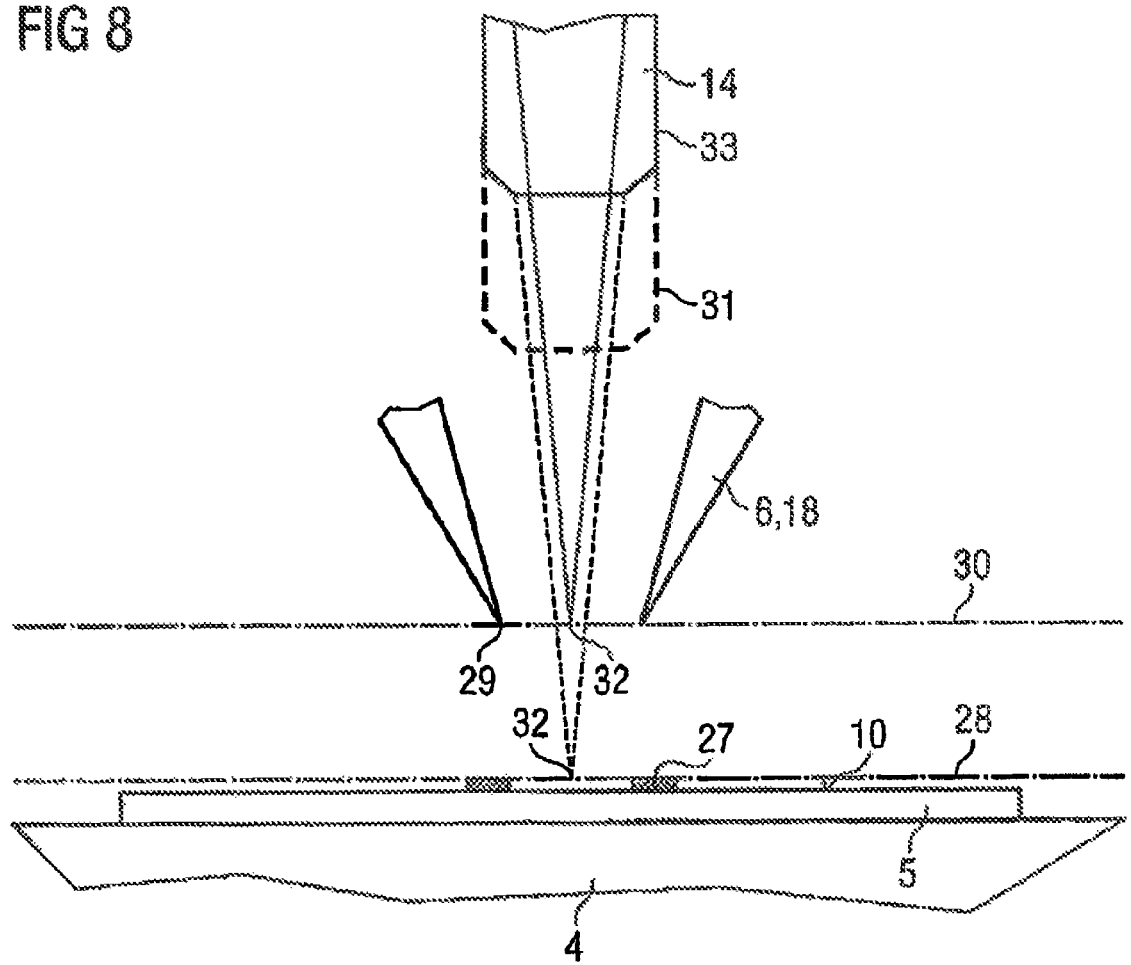
FIG. 8 is an exploded view of the probe needles with respect to the surface of the test object.

As FIG. 8 shows, the contact pads 27 of the test object 5 are in the state, since the probe needles 6 are not in contact with the contact pads. Hence, it is possible to move the test object in relation to the probe needles 6 into a first focal plane 28 and to move the tips 29 of the probe needles 6 into a second focal plane 30. At this stage with the microscope objective lens focusing system 20 the objective lens 14 is moved from a first position 31, in which the focus 32 is in the first focal plane 28, into a second position 33, in which the focus 32 of the objective lens 14 is in the second focal plane. Between these two positions 31 and 33, the objective lens 14 is then switched back and forth; and the images are projected one over the other, so that the images of both planes appear to be sharp.

The invention claimed is:

1. System for a focused multi-planar image acquisition in a prober comprising a movement device; a clamping fixture mounted on said movement device and adapted for clamping a test object; probe needles, which can make contact with the test object; holding devices for the probe needles; a clamping plate arranged above the clamping fixture and on which the holding devices are mounted and which has a viewing aperture, which visibly exposes a surface of the test object; and an image capturing device mounted over the viewing aperture and connected to an image evaluating unit, the image capturing device comprising a microscope with an objective lens and an objective holder and provided with a lighting device to produce a light beam, directed on the surface of the test object, wherein the objective lens is provided with a microscope objective lens focusing system to focus the objective lens, independently of a vertical adjustment drive of the microscope, on the surface of the test object in a first focal plane and in a second focal plane, which is on a level with tips of the probe needle, wherein the microscope comprises a confocal microscope.

2. Method for a focused multi-planar image acquisition in a prober, wherein, when a surface of a test object is positioned laterally in relation to tips of separated probe needles, a microscope is focused on a surface of the test object at a first time and on a plane of the probe needles at a second time, wherein an objective lens of the microscope is focused, independently of a vertical adjustment of the microscope, on the surface and the plane at different times; and during positioning, respective focus settings on the objective lens are changed multiple times, wherein the images captured by the microscope are captured by a video camera and displayed on a screen, wherein the images captured by the video camera are fed to an image evaluating unit; and at least two sequential images, captured with different focus settings, are stored and are displayed in the display so as to be projected one over another.

3. Method for a focused multi-planar image acquisition in a prober, wherein, when a surface of a test object is positioned laterally in relation to tips of separated probe needles, a microscope is focused on a surface of the test object at a first time and on a plane of the probe needles at a second time, wherein an objective lens of the microscope is focused, independently of a vertical adjustment of the microscope, on the surface and the plane at different times; and during positioning, respective focus settings on the objective lens are changed multiple times, wherein the focus settings are changed in such a manner that several images of the test object are taken with an illumination, a color of the illumination varying with respective images; and then an image of the tips of the probe needles is captured; and that one image is assembled from the images of the test object by projecting the image of the tips of the probe needles into said image.

4. Method, as claimed in claim 3, wherein, when an image is captured in a different luminous color, a focus setting optimized for sharpness with respect to the luminous color is carried out at the objective lens.

* * * * *